United States Patent
Matignon

(10) Patent No.: US 9,512,577 B2
(45) Date of Patent: Dec. 6, 2016

(54) BRIDGE ADAPTED FOR ACCESSING AN AIRCRAFT COMPARTMENT VIA A MANHOLE

(71) Applicant: Airbus (SAS), Blagnac (FR)

(72) Inventor: Mickael Matignon, Aussonne (FR)

(73) Assignee: Airbus (SAS), Blagnac (FR)

(*) Notice: Subject to any disclaimer, the term of this patent is extended or adjusted under 35 U.S.C. 154(b) by 0 days.

(21) Appl. No.: 14/754,974

(22) Filed: Jun. 30, 2015

(65) Prior Publication Data

US 2016/0002869 A1  Jan. 7, 2016

(30) Foreign Application Priority Data

Jul. 3, 2014  (FR) .................................. 14 56360

(51) Int. Cl.
| | | |
|---|---|---|
| *E01D 15/00* | (2006.01) | |
| *E01D 18/00* | (2006.01) | |
| *B64C 1/14* | (2006.01) | |
| *B64F 5/00* | (2006.01) | |
| *E01D 15/12* | (2006.01) | |

(52) U.S. Cl.
CPC .............. *E01D 18/00* (2013.01); *B64C 1/1446* (2013.01); *B64F 5/00* (2013.01); *B64F 5/0081* (2013.01); *E01D 15/12* (2013.01)

(58) Field of Classification Search
CPC ..... E01D 15/12; E01D 18/00; B64F 1/1446; B64F 5/00; B64F 5/0081; B64C 1/1446
USPC .............................. 14/69.5–71.5; 182/2.5, 12
See application file for complete search history.

(56) References Cited

U.S. PATENT DOCUMENTS

| 2,551,345 | A | | 5/1951 | Scott | |
|---|---|---|---|---|---|
| 2,933,149 | A | | 4/1960 | Frederick | |
| 5,279,389 | A | * | 1/1994 | Crockett | E06C 7/48 182/129 |
| 5,402,546 | A | * | 4/1995 | Baranowski | E01C 9/08 14/69.5 |
| 5,950,266 | A | * | 9/1999 | Streeter | E01D 15/24 14/69.5 |
| 6,330,726 | B1 | * | 12/2001 | Hone | B64F 1/305 14/69.5 |
| 6,676,358 | B2 | * | 1/2004 | Smith | B64F 1/315 14/69.5 |
| 6,678,910 | B2 | * | 1/2004 | Smith | B64F 1/305 14/69.5 |
| 6,813,792 | B2 | * | 11/2004 | Miller | B63B 27/143 14/69.5 |
| 7,310,843 | B1 | * | 12/2007 | Mitchell | B65G 69/30 14/69.5 |
| 8,839,907 | B2 | * | 9/2014 | Davis, Jr. | E06C 7/182 182/106 |

FOREIGN PATENT DOCUMENTS

FR  2875476  3/2006

OTHER PUBLICATIONS

French Search Report, Feb. 25, 2015.

* cited by examiner

*Primary Examiner* — Raymond W Addie
(74) *Attorney, Agent, or Firm* — Greer, Burns & Crain, Ltd.

(57) ABSTRACT

A bridge configured to allow access by an operative to an aircraft compartment via a manhole formed in a wall. The bridge comprises an overlapping section which includes at least one plate, a transverse runner beneath the plate or plates with at least one groove configured to receive a lower edge of the manhole, at least a first support configured to rest on one side of the wall and at least a second support configured to rest on the other side of the wall.

13 Claims, 5 Drawing Sheets

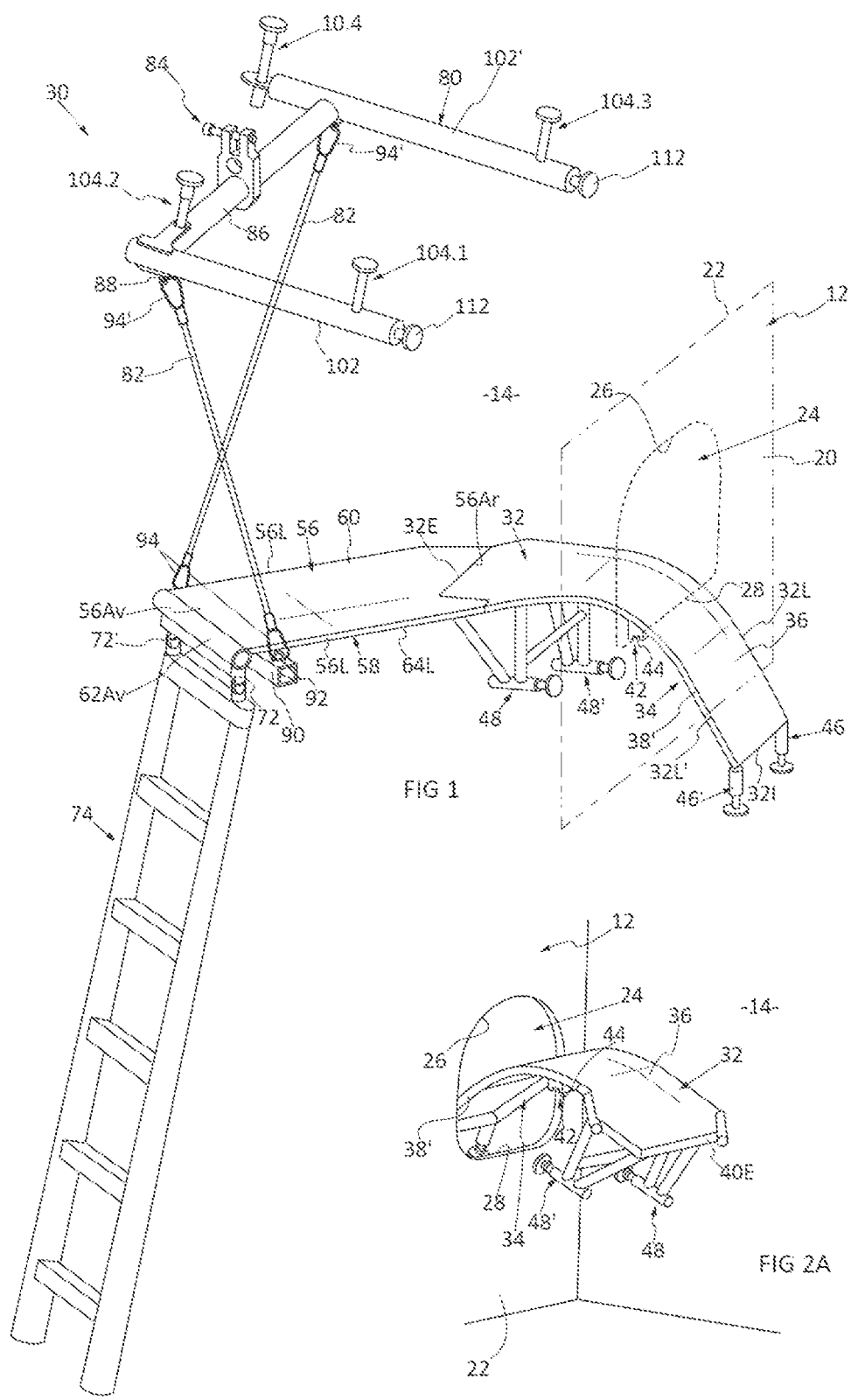

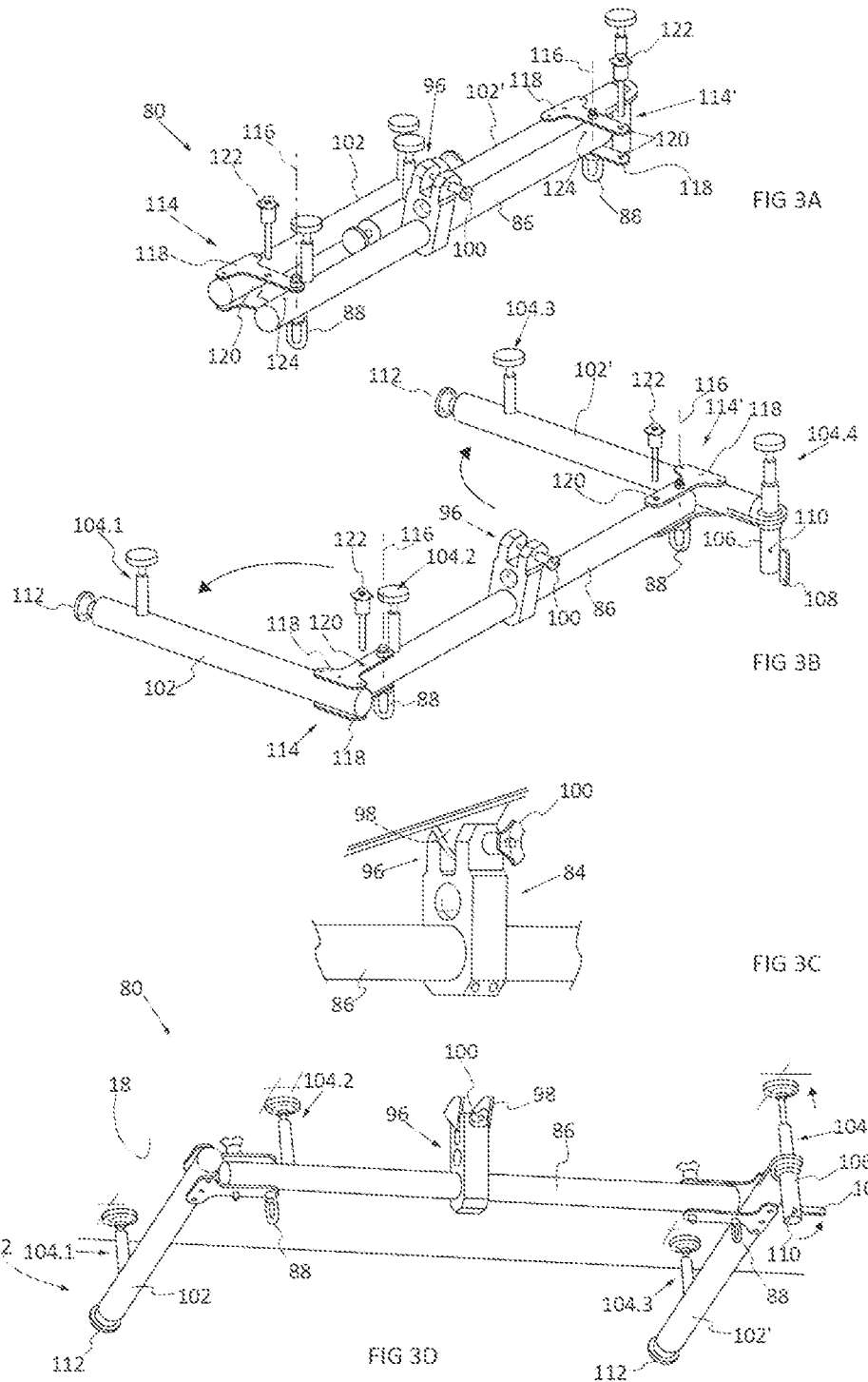

BRIDGE ADAPTED FOR ACCESSING AN AIRCRAFT COMPARTMENT VIA A MANHOLE

CROSS-REFERENCES TO RELATED APPLICATIONS

This application claims the benefit of the French patent application No. 1456360 filed on Jul. 3, 2014, the entire disclosures of which are incorporated herein by way of reference.

BACKGROUND OF THE INVENTION

The present invention relates to a bridge adapted for accessing an aircraft compartment via a manhole.

Certain aircraft maintenance operations require access to be gained to the inside of the aircraft's central wing box. To this end, the central wing box comprises a manhole in one of its vertical walls that adjoins a gear compartment. Because the manhole is situated at a certain height, a ladder has to be used to reach it.

Passing through the manhole has proved to be a critical operation, since the central wing box comprises sections of composite material around the manhole that can be damaged if an operative rests on them.

SUMMARY OF THE INVENTION

The present invention proposes a solution that reduces the risk of damaging parts of the aircraft close to the manhole.

To this end, an object of the invention is a bridge adapted for accessing an aircraft compartment via a manhole formed in a wall, said bridge being characterized in that it comprises an overlapping section which includes at least one plate, a transverse runner beneath the plate or plates with at least one groove configured to receive a lower edge of the manhole, at least a first support configured to rest on a first side of the wall and at least a second support configured to rest on a second side of the wall.

According to this configuration, the transverse runner of the bridge protects the edge of the manhole. Parts of the compartment close to the wall or the manhole are protected, since the bridge offers a support surface that extends on either side of the wall and along which the operatives can slide.

The combination of transverse runner and supports provided on either side of the wall gives the bridge substantial stability.

According to one characteristic, the bridge comprises at least one fixing member for hooking a ladder to the bridge. This configuration allows a reliable connection to be established between a ladder and the bridge.

The bridge advantageously comprises a platform positioned in the extension of the overlapping section on the second side of the wall and a detachable connection which guarantees the junction between the platform and the overlapping section.

This configuration offers a greater surface to the outside of the compartment between the ladder and the manhole, allowing the operatives to position themselves more easily in order to pass through the manhole.

The bridge preferably comprises a suspension to support the platform, at least one cable attaching said platform to said suspension and a detachable fixing to attach said suspension to an aircraft structure above the bridge.

The suspension ensures that the loads applied to the platform overhang are absorbed.

According to one characteristic, the suspension comprises a bar and two cables, each attached to one end of said bar, and the platform comprises a supporting cross member that extends on either side of the platform, the ends of said cross member being attached to the cables. This configuration improves the absorption of loads.

The suspension advantageously comprises, in addition to the bar, a first arm attached to a first end of the bar, to which is fixed a first foot configured to be in contact with the structure of the aircraft, a second foot fixed to the bar and configured to be in contact with the structure of the aircraft, a second arm attached to a second end of the bar to which is fixed a third foot configured to be in contact with the structure of the aircraft. This configuration allows the stability of the suspension and therefore of the bridge to be reinforced.

The suspension advantageously comprises a fourth movable foot between a lower position in which it is remote from the structure of the aircraft and an upper position in which it is in contact with the structure of the aircraft, as well as a lever to switch said fourth foot from one position to the other.

Each arm is advantageously attached to the bar by a hinge allowing each arm to pivot with respect to said bar between a first folded position in which each arm is parallel to the bar and a second deployed position in which each arm is perpendicular to the bar.

According to another characteristic, each arm comprises a buffer level with its end turned towards the wall in a material adapted to avoid damaging the wall.

According to another characteristic, the overlapping section comprises a chassis with side tubes emerging level with an outer edge turned towards the platform and the platform comprises a chassis with side longitudinal rails, the ends whereof fit in the side tubes of the overlapping section.

According to another characteristic, the overlapping section comprises two internal feet configured to bear against a floor of the compartment and two outer feet configured to bear against the wall on the outside of the compartment.

BRIEF DESCRIPTION OF THE DRAWINGS

Other characteristics and advantages will emerge from the following description of the invention, said description being provided solely by way of example, with regard to the attached drawings in which:

FIG. 1 is a perspective view of a bridge used to pass through a manhole illustrating an embodiment of the invention, FIGS. 2A to 2C are perspective views of a first part of the bridge during its installation on either side of a wall containing the manhole, FIGS. 3A to 3D are perspective views of different installation stages of a suspension in which a platform of the bridge illustrated in FIG. 1 is suspended.

DETAILED DESCRIPTION OF THE PREFERRED EMBODIMENTS

Figure 2B:
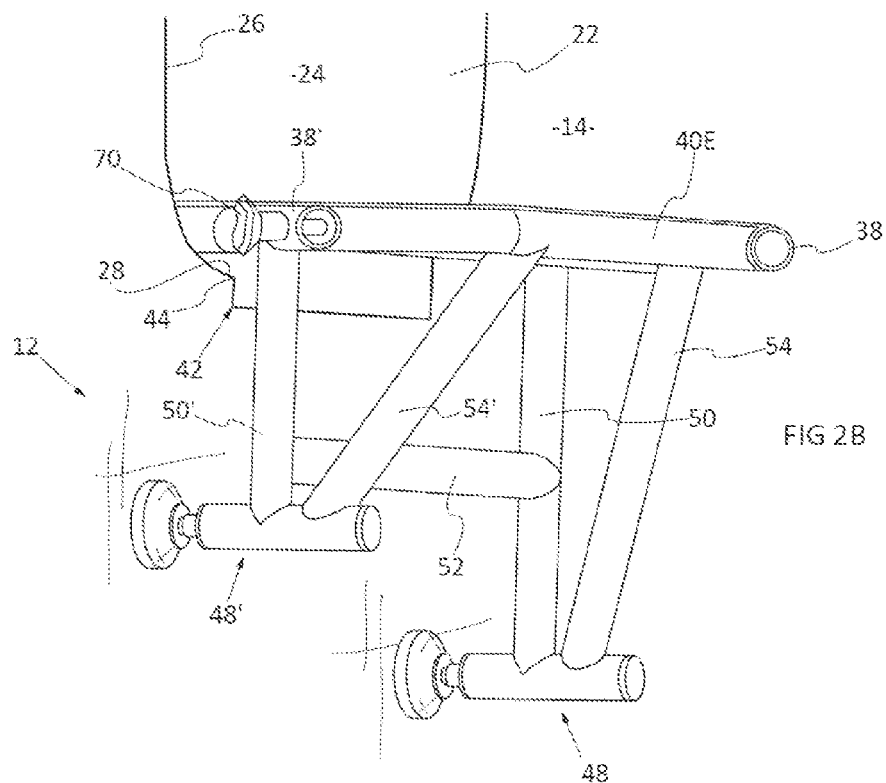

In the figures, 10 is used to denote a central wing box separated by a wall 12 from a gear compartment 14. The central wing box 10 comprises a floor 16 that can be seen in FIGS. 2A and 2C and the gear compartment 14 comprises a ceiling 18 that can be seen in FIG. 3D.

The wall 12 comprises an inner face 20 turned towards the central wing box 10 and an outer face 22 turned towards the gear compartment 14. This wall 12 contains a manhole 24 that crosses it and has a circumference 26 with a lower edge 28 substantially rectilinear and horizontal. According to one configuration, the wall 12 is approximately vertical.

Although it is described as applying to a central wing box, the invention is not limited to this application. Hence, it can be adapted to any compartments of an aircraft that are accessible by a manhole provided in a wall.

In the description that follows a transverse plane is a plane parallel to the wall 12 and a longitudinal direction is a direction perpendicular to a transverse plane.

A bridge 30 is used to gain access to the central wing box 10. It comprises an overlapping section 32 that crosses the manhole and extends on either side of the wall 12. This overlapping section 32 comprises a chassis 34 supporting at least one plate 36 which provides an upper surface along which an operative can slide in order to gain access to the central wing box 10.

The overlapping section 32 comprises two side edges 32L and 32L' which extend from an outer edge 32E to an inner edge 32I.

According to one configuration, the side edges 32L and 32L' are perpendicular to the wall 12 on the inside of the central wing box and the inner edge 32I is parallel to this wall 12. On the outside of the central wing box 10, the side edges 32L and 32L' are parallel to one another and form an angle in the order of 45° relative to the wall 12. This orientation of the side edges 32L and 32L' on the outside of the central wing box 10 is adapted to direct the bridge 30 towards a clear area of the gear compartment. The invention is not limited to this orientation. Hence, the overlapping section 32 is directed on the outside of the compartment according to the clear areas on the outside of the compartment.

According to one embodiment, the overlapping section 32 comprises a plurality of juxtaposed plates 36 that provide continuous juxtaposed upper surfaces along which an operative can slide, in order to gain access to the central wing box. These plates 36 are metal sheets, for example. The plates 36 are attached to the chassis by any appropriate means such as rivets, for example. The plates 36 are sufficiently flexible to adapt to the geometry of the chassis 34.

The chassis 34 is tubular. For each side edge 32L and 32L' it comprises at least one side tube 38, 38' (or a plurality of tubes placed end to end). It likewise comprises a plurality of tubular cross members 40 that attach the side tubes 38, 38', particularly an outer cross member 40E level with the outer edge 32E, an inner cross member 40I level with the inner edge 32I and at least one intermediate cross member 40 to the right of the lower edge 28 of the manhole 24. According to one embodiment, the outer cross member 40E comprises a first portion 41.1 parallel to the wall 12 and a second portion 41.2 perpendicular to the wall 12, as illustrated in FIGS. 4A to 6.

The chassis 34 is configured so that the part of the overlapping section 32 situated on the outside of the central wing box 10 is substantially horizontal and the portion of the overlapping section 32 situated on the inside of the central wing box is curved and/or inclined, so that the inner edge 32I is at a low height of the floor 16. In order to give an idea of size, the inner edge 32I is situated at a height in the order of 10 to 30 cm relative to the floor 16.

The overlapping section 32 comprises means of positioning and immobilizing it in relation to the wall 12 and/or the manhole 24.

To this end, the chassis 34 comprises a transverse runner 42 provided beneath one of the plates 36 with at least one groove 44 in which the lower edge 28 of the manhole is inserted. The transverse runner 42 is preferably a profile, in elastomer for example.

The transverse runner 42, like the groove 44, extends from one side tube 38 to the other 38'.

The groove 44 has a width substantially equal to the thickness of the wall 12, such that the lower edge 28 fits into the groove 44. According to one configuration, the transverse runner 42 is fixed to the third cross member 40.

The material of the transverse runner 42 is chosen so as to avoid damaging the edge of the wall 12 that is in composite material and to avoid delaminating it. The transverse runner 42 extends over the entire width of the bridge, in such a manner as to reduce the contact pressure.

Ultimately, the transverse runner 42 allows the bridge to be immobilized in the longitudinal direction and in a vertical direction. However, the transverse runner 42 gives a degree of freedom corresponding to a rotation about an axis that coincides with the lower edge 28.

To complement the transverse runner 42, the bridge 30 comprises at least one inner foot 46 provided level with the inner edge 32I of the bridge 30 configured to support the floor 16 of the central wing box. The bridge 30 preferably comprises two inner feet 46, 46' provided at each end of the inner edge 32I to confer improved stability.

Each inner foot 46 is advantageously height-adjustable.

For an improved absorption of loads, the inner feet 46 are attached to the chassis 34, so that they are oriented approximately perpendicularly to the floor 16. According to one embodiment, the inner feet 46, 46' are fixed to the inner cross member 40I.

To complement the transverse runner 42 and the foot or feet 46, the bridge 30 comprises at least one outer foot 48 configured to bear against the outer face 22 of the wall 12. The bridge 30 preferably comprises two outer feet 48, 48' provided perpendicular to each side edge 32L and 32L', in order to confer improved stability.

Each outer foot 48 is advantageously depth-adjustable, so that its position can be adjusted in the longitudinal direction.

For the outer feet 48, 48', the chassis 34 comprises two vertical members 50, 50', a first right vertical member 50 that is attached perpendicularly to the right side tube 38 and a second left vertical member 50' that is attached perpendicularly to the left side tube 38'. The two vertical members 50, 50' are kept parallel by a cross member 52.

Each outer foot 48, 48' is attached to the lower end of a vertical member 50, 50'. To ensure an improved absorption of loads, the chassis 34 comprises for each outer foot 48, 48' an oblique reinforcement 54, 54' that attaches the outer cross member 40E to the foot 48, 48'.

One of the vertical members 50 is preferably longer than the other vertical member 50', so that one of the feet 48 is further away from the bridge 30 than the other foot. This configuration guarantees an improved absorption of loads when the part of the overlapping section 32 situated on the outside of the central wing box bridge is not oriented perpendicularly to the wall 12. If the bridge is directed towards the left on the outside of the central wing box, the right outer foot is further away from the bridge. Conversely, if the bridge is directed towards the right on the outside of the central wing box, the left outer foot is further away from the bridge.

According to one embodiment, each inner or outer foot 46, 46', 48, 48' comprises a threaded rod with a first end screwing in a tube integral with the chassis 34 and a second end attached by a pivot-type connection to a circular runner in a material adapted so as not to damage the floor 16. Each foot comprises a locknut that allows the rod to be locked in translation with respect to the tube. The invention is not limited to this embodiment for the adjustable foot or feet.

Whatever the variant, the overlapping section 32 comprises a transverse runner 42 with at least one groove 44 configured to receive the lower edge 28 of the manhole, at least one support configured to bear against the inside of the compartment, such as an inner foot 46, and at least one support configured to bear against the outside of the compartment, such as an outer foot 48. This configuration allows a bridge to be obtained that limits the risk of damaging sensitive parts of the compartment and is immovable and stable in respect of the wall of the compartment being passed through.

The bridge 30 advantageously comprises a platform 56 which extends the overlapping section 32 on the outside of the central wing box and a detachable connection which ensures the connection between the platform 56 and the overlapping section 32. The provision of a bridge in two parts (overlapping section/platform) allows light, manageable parts to be handled independently of one another.

This platform 56 comprises a chassis 58 on which at least one plate 60 is fixed which provides an upper surface along which an operative can slide to gain access to the central wing box.

This platform 56 comprises a rear edge 56Ar which is in contact with the outer edge 32E of the overlapping section 32 when the platform 56 is mounted in the extension of said overlapping section 32, a front edge 56Av and parallel side edges 56L. The chassis 58 advantageously comprises a rear cross member 62Ar that coincides with the rear edge 56Ar, a front cross member 62Av that coincides with the front edge 56Av and longitudinal rails 64 that attach the front and rear cross members. The chassis 58 comprises side longitudinal rails 64L, 64L' that coincide with the side edges 56L and 56L'. According to a configuration that can be seen in FIG. 6, the chassis 58 comprises two intermediate longitudinal rails 64 and 64'.

Figure 6:
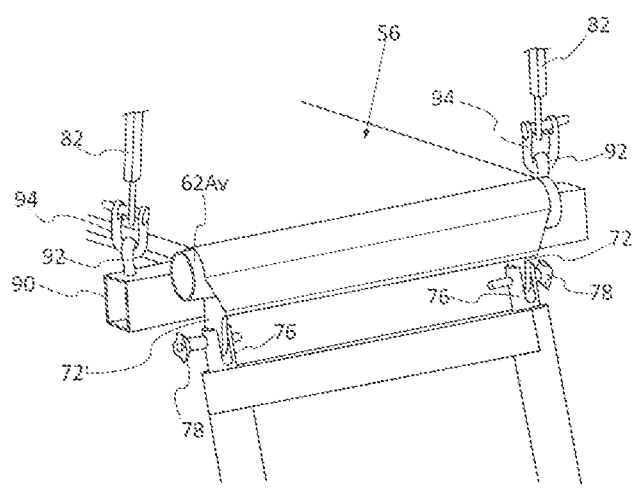
FIG. 6 is a perspective view illustrating in detail the connection between the bridge and a ladder.

Like the outer cross member 40E, the rear cross member 62Ar comprises a first portion 63.1 parallel to the wall 12 and a second portion 63.2 perpendicular to the wall 12, as illustrated in FIG. 6.

According to one embodiment, the longitudinal rails and the cross members are tubular.

Figure 4A:
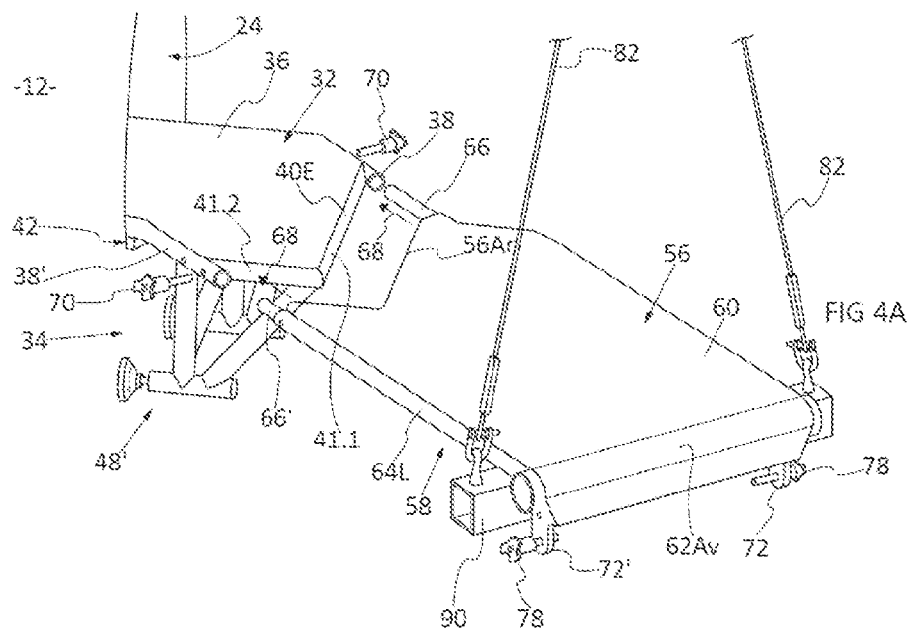
FIGS. 4A and 4B are perspective views of the different installation stages of a platform of the bridge illustrated in FIG. 1.
Figure 4B:
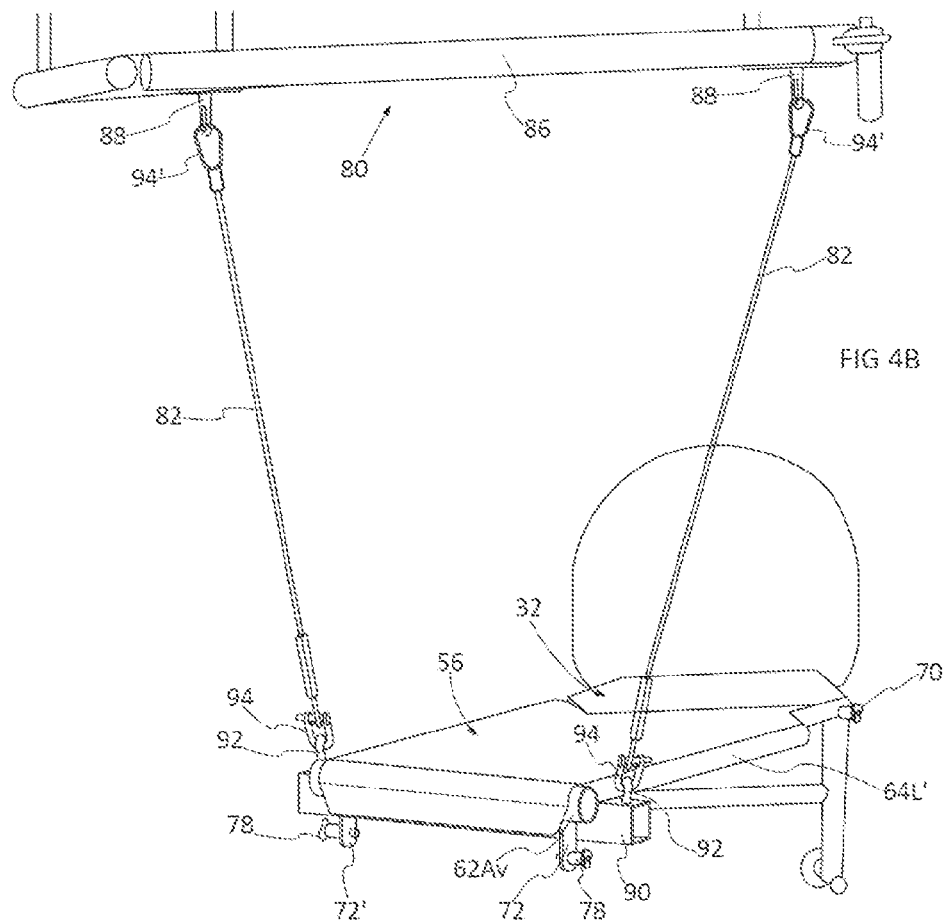
Figure 5:
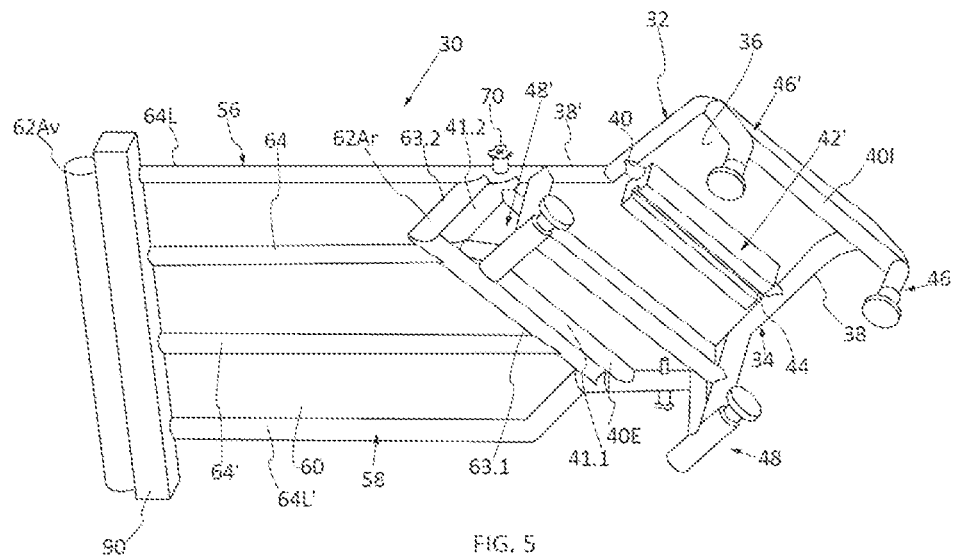
FIG. 5 is a view from below of the bridge illustrated in FIG. 1.

According to one embodiment, in order to guarantee the connection between the platform 56 and the overlapping section 32, the side tubes 38, 38' emerge level with the outer edge 32E, and side longitudinal rails 64L, 64L' have ends 66, 66' with a smaller diameter so that they can fit into the side tubes 38, 38', as illustrated by the arrows 68 in FIG. 4A.

For each side tube/side longitudinal rail pair, the connection between the platform 56 and the overlapping section 32 comprises a ball spindle 70 that crosses the side tube 38, 38' and the end 66, 66' of the corresponding side longitudinal rail 64L, 64L' in such a manner as to immobilize one in respect of the other. To this end, each side tube 38, 38' comprises openings that are aligned with openings made in the end 66, 66' of the corresponding side longitudinal rail 64L, 64L' when said side longitudinal rail is fitted in the side tube.

According to another characteristic of the invention, the bridge 30 comprises at least one fixing member 72 for hooking a ladder 74. The fixing member 72 must allow the ladder 74 to be hooked and unhooked easily. The ladder 74 is advantageously telescopic to adapt to different heights, the height of the manhole varying depending on the payload of the aircraft.

The bridge 30 preferably comprises two fixing members 72, 72', one for each vertical member of the ladder 74.

According to one embodiment, each fixing member 72, 72' takes the form of a foot.

According to one method of assembly, each fixing member 72, 72' comprises a through-hole, each vertical member comprises at the level of its upper end a cap piece 76 in which is inserted a fixing member 72, 72', a dowel or a ball spindle 78 being provided for each pair of fixing members and cap pieces to immobilize them in relation to one another.

According to one embodiment, the fixing members 72, 72' are secured to the platform 56 and, more particularly, to the front cross member 62Av.

Alternatively, if the bridge 30 does not have a platform 56, the fixing members 72, 72' are secured to the overlapping section 32, more particularly to the outer cross member 32E.

The presence of a platform is not necessary, but it is preferred since the platform provides a greater surface on the outside of the compartment on which the operative can position himself between the ladder and the manhole.

According to another characteristic of the invention, the bridge 30 comprises a suspension 80 for supporting the platform 56, at least one cable 82 attaching said platform to said suspension 80 and a detachable fixing 84 for attaching said suspension 80 to the ceiling 18 in the gear compartment, more broadly to an aircraft structure above the bridge.

The suspension 80 allows the absorption of loads generated by the overhang of the platform 56.

The suspension 80 preferably comprises a bar 86 with a securing loop 88 at each end allowing a cable 82 to be secured.

In order to secure the cables 82 to the platform 56, said platform comprises a supporting cross member 90 which is positioned beneath the longitudinal rails 64, 64', 64L and 64L' and which extends on either side of the platform. This supporting cross member 90 is positioned proximate to the front cross member 62Av. It is secured by any appropriate means to the longitudinal rails.

This supporting cross member 90 comprises a securing loop 92 at each end allowing a cable 82 to be secured.

According to one embodiment, each cable 82 comprises a carabiner at each of its ends, a first carabiner 94 for securing to the platform 56 thanks to one of the securing loops 92, and a second carabiner 94' for securing it to the bar 86 thanks to one of the securing loops 88. Each cable 82 advantageously comprises a tension device for adjusting its tension.

The detachable fixing 84 preferably comprises a cap piece 96 integral with the bar 86, a securing loop 98 integral with the ceiling 18 of the gear compartment, and a ball spindle 100 for securing the cap piece 96 to the securing loop 98.

The suspension 80 advantageously comprises means of stabilizing the bar 86 which allow it to be immobilized in respect of the ceiling 18.

According to one embodiment, the stabilization means comprise:
  two arms 102, 102' attached to the bar 86, a first arm 102 attached to a first end of the bar 86 and a second arm 102' attached to the second end of the bar 86,
  a first foot 104.1 fixed to the first arm 102 and configured to be in contact with the structure of the aircraft, particularly the ceiling of the gear compartment, a second foot 104.2 fixed to the bar 86 and configured to be in contact with the structure of the aircraft, particularly the ceiling of the gear compartment, a third foot 104.3 fixed to the second arm 102' and configured to be in contact with the structure of the aircraft, particularly the ceiling of the gear compartment.

The feet 104.1, 104.2, 104.3 are preferably identical to the inner or outer feet 46, 46', 48, 48'. Their threaded rods are perpendicular to the arms or the bar.

The stabilization means advantageously comprise a fourth foot 104.4 that can be moved between a lower position (can be seen in FIG. 3B) in which it is spaced apart from the ceiling 18 and a high position (can be seen in FIG. 3D) in which it is in contact with the ceiling 18. This fourth foot 104.4 is attached to the second arm 102' by a translation mechanism that comprises a hollow cylinder 106 in which the fourth foot 104.4 can run in a translation direction perpendicular to the ceiling 18 and to the second arm 102' as well as a lever 108 for switching from the lower position towards the upper position (as illustrated in FIG. 3D) or vice versa. The lever 108 may pivot about a rotational axis 110 in respect of the hollow cylinder 106 between a first position (can be seen in FIG. 3B) in which the lever 108 is parallel to the translation direction and which corresponds to the lower position of the fourth foot 104.4 and a second position (can be seen in FIG. 3D) in which the lever 108 is perpendicular to the translation direction and which corresponds to the upper position of the fourth foot 104.4.

The feet 104.1 to 104.4 are arranged in such a manner as to be the furthest apart from one another, in order to achieve the greatest stability. Hence, the first foot 104.1 is positioned proximate to the end of the first arm 102 furthest away from the bar 86. The second foot 104.2 is positioned at the end of the bar 86 close to the first arm 102. The third foot 104.3 is positioned proximate to the end of the second arm 102' furthest away from the bar 86 and the fourth foot 104.4 is positioned proximate to the end of the second arm 102' closest to the bar 86.

The feet 104.1 to 104.4 allow the suspension 80 to be positioned in relation to a positioning plane parallel to the floor 18.

Each arm 102, 102' preferably comprises a buffer 112 level with its end turned towards the outer face 22 of the wall 12. Each buffer 112 is in a material adapted to avoid damage to the outer face 22 of the wall 12.

The buffers 112 likewise allow the suspension 80 in the positioning plane to be immobilized.

Each arm 102, 102' is preferably attached to the bar 86 by a hinge 114, 114', allowing each arm 102, 102' to pivot in relation to said bar 86 between a first folded position, as illustrated in 3A, in which each arm 102, 102' is parallel to the bar 86, and a second deployed position, as illustrated in FIG. 3B, in which each arm 102, 102' is perpendicular to the bar 86.

Each hinge 114, 114' comprises a pivoting axis 116 perpendicular to the bar 86. According to one embodiment, each articulation comprises two T-shaped plates 118 parallel to one another, perpendicular to the pivoting axis 116 and disposed on either side of the arm and the bar. The head of the T is secured on the bar 102 our 102' and the foot of the T comprises at least two holes, a first hole crossed by the rotational axis 116 and a second hole 120 crossed by a ball spindle 122.

For each hinge, the bar 86 comprises two openings that cross it, a first opening crossed by the rotational axis 116 and a second opening 124 crossed by the ball spindle 122 when the corresponding arm is in the deployed position.

Hence, in the folded position, the arms 102, 102' are parallel to the bar 86. The holes 120 in the T-shaped plates do not coincide with the openings 124 in the bar 86, as illustrated in FIG. 3A. The ball spindles 122 only cross the T-shaped plates 118. To deploy the arms 102 and 102', the ball spindles 122 are removed. The arms 102 and 102' are pivoted until the holes 120 in the T-shaped plates coincide with the openings 124 in the bar 86. The ball spindles 122 are introduced into the holes 120 and the openings 124 in such a manner as to cross the bar and the arms and immobilize them in the deployed position, as illustrated in FIG. 3B.

Figure 2C:
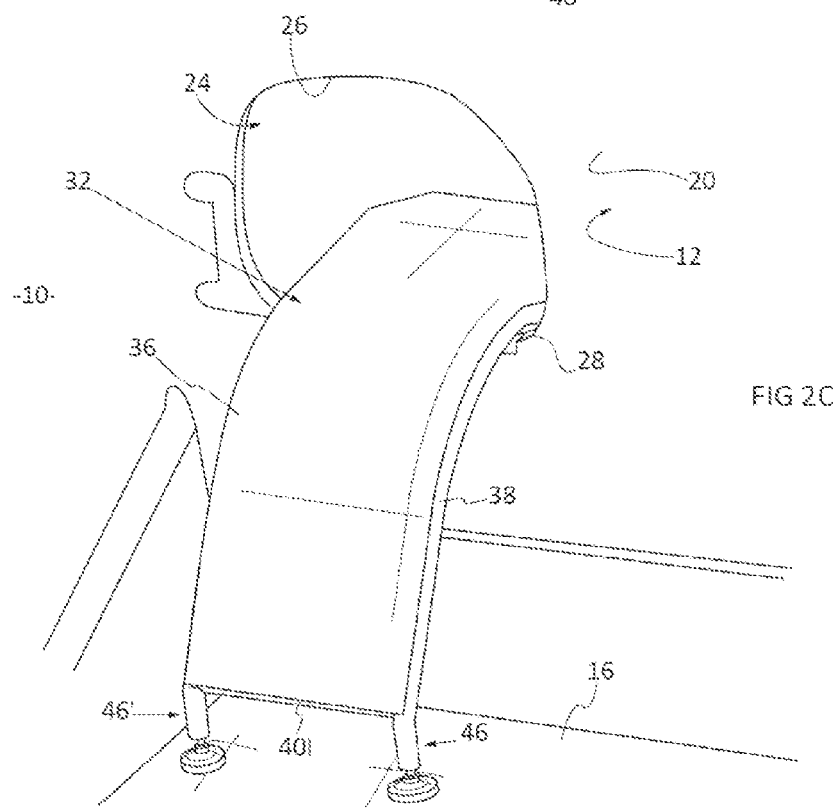

The bridge is installed in the following manner:

To begin with, the overlapping section 32 is moved into the gear compartment then partially introduced into the central wing box 10, as illustrated in FIG. 2A. The overlapping section 32 is positioned such that the lower edge 28 fits in the groove 44 in the transverse runner 42.

The inner feet 46, 46' may be adjusted such that they are in contact with the floor 16 of the central wing box 10. The outer feet 48, 48' are then adjusted so as to be in contact with the wall 12.

Following these stages, the overlapping section 32 is stable.

The suspension 80 is deployed and its movable foot 104.4 is positioned in the lower position, as illustrated in FIGS. 3A and 3B. Next, the suspension is secured to the ceiling 18 of the gear compartment thanks to the connection 84, as illustrated in FIG. 3C. The movable foot 104.4 is positioned in the upper position (as illustrated in FIG. 3D) and the other feet 104.1 to 104.3 are, where necessary, adjusted so as to be in contact with the ceiling 18.

Following the positioning of the suspension 80, the platform 56 is moved into the gear compartment and secured to the overlapping section 32, as illustrated in FIG. 4A. The cables 82 are then put in position to secure the platform 56 to the suspension 56 and their tensions are then readjusted where necessary.

Finally, the ladder 74 is secured to the bridge 30.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A bridge configured to allow an operative to access an aircraft compartment via a manhole formed in a wall, said bridge comprising:
    an overlapping section including at least one plate, wherein the overlapping section comprises a chassis with side tubes,
    a transverse runner beneath the at least one plate with at least one groove configured to receive a lower edge of the manhole, wherein the transverse runner extends between the side tubes of the chassis of the overlapping section, at least a first support configured to rest on a first surface, and at least a second support configured to rest on a second surface, wherein the first surface and the second surface are disposed on opposite sides of the wall.

2. The bridge according to claim 1, further comprising at least one fixing member for hooking a ladder to the bridge.

3. The bridge according to claim 1, further comprising a platform positioned in an extension of the overlapping section on the second side of the wall and a detachable connection which assures a junction between the platform and the overlapping section.

4. The bridge according to claim 3, further comprising a suspension to support the platform, at least one cable attaching said platform to said suspension and a detachable fixing to attach said suspension to an aircraft structure above the bridge.

5. The bridge according to claim 4, wherein the suspension comprises a bar and two cables, each attached to one end of said bar, and wherein the platform comprises a supporting cross member that extends on either side of the platform, the ends of said cross member being attached to the cables.

6. The bridge according to claim 5, wherein the suspension comprises, in addition to the bar, a first arm attached to a first end of the bar, to which is fixed a first foot configured to be in contact with the structure of the aircraft, a second foot fixed to the bar and configured to be in contact with the structure of the aircraft, a second arm attached to a second end of the bar to which is fixed a third foot configured to be in contact with the structure of the aircraft.

7. The bridge according to claim 6, wherein the suspension comprises a fourth foot movable between a lower position in which it is remote from the structure of the aircraft and an upper position in which it is in contact with the structure of the aircraft, as well as a lever to switch said fourth foot from one position to the other.

8. The bridge according to claim 6, wherein each arm is attached to the bar by a hinge allowing each arm to pivot with respect to said bar between a first folded position in which each arm is parallel to the bar and a second deployed position in which each arm is perpendicular to the bar.

9. The bridge according to claim 6, wherein each arm comprises a buffer level with its end turned towards the wall in a material adapted to avoid damaging the wall.

10. The bridge according to claim 3, wherein the side tubes of the chassis emerge level with an outer edge turned towards the platform and wherein the platform comprises a chassis with side longitudinal rails with ends that fit in the side tubes of the overlapping section.

11. The bridge according to claim 1, wherein the overlapping section comprises two internal feet configured to bear against a floor of the compartment and two outer feet configured to bear against the wall on the outside of the compartment.

12. A bridge configured to allow an operative to access an aircraft compartment via a manhole formed in a wall, said bridge comprising:

an overlapping section including at least one plate, a transverse runner beneath the at least one plate with at least one groove configured to receive a lower edge of the manhole, a platform positioned in an extension of the overlapping section and a detachable connection which assures a junction between the platform and the overlapping section, a suspension to support the platform, at least one cable attaching said platform to said suspension and a detachable fixing to attach said suspension to an aircraft structure above the bridge, at least a first support configured to rest on a first surface, and at least a second support configured to rest on a second surface, wherein the first surface and the second surface are disposed on opposite sides of the wall.

13. A bridge configured to allow an operative to access an aircraft compartment via a manhole formed in a wall, said bridge comprising:

an overlapping section including at least one plate, a transverse runner beneath the at least one plate with at least one groove configured to receive a lower edge of the manhole, comprising a platform positioned in an extension of the overlapping section on the second side of the wall and a detachable connection which assures a junction between the platform and the overlapping section, and wherein the overlapping section comprises a chassis with side tubes emerging level with an outer edge turned towards the platform and wherein the platform comprises a chassis with side longitudinal rails with ends that fit in the side tubes of the overlapping section, at least a first support configured to rest on a first side of the wall, and at least a second support configured to rest on a second side of the wall.

* * * * *